June 8, 1943. W. J. DE WITT ET AL 2,321,068
METHOD OF WELDING
Filed Jan. 23, 1941　　　5 Sheets-Sheet 4

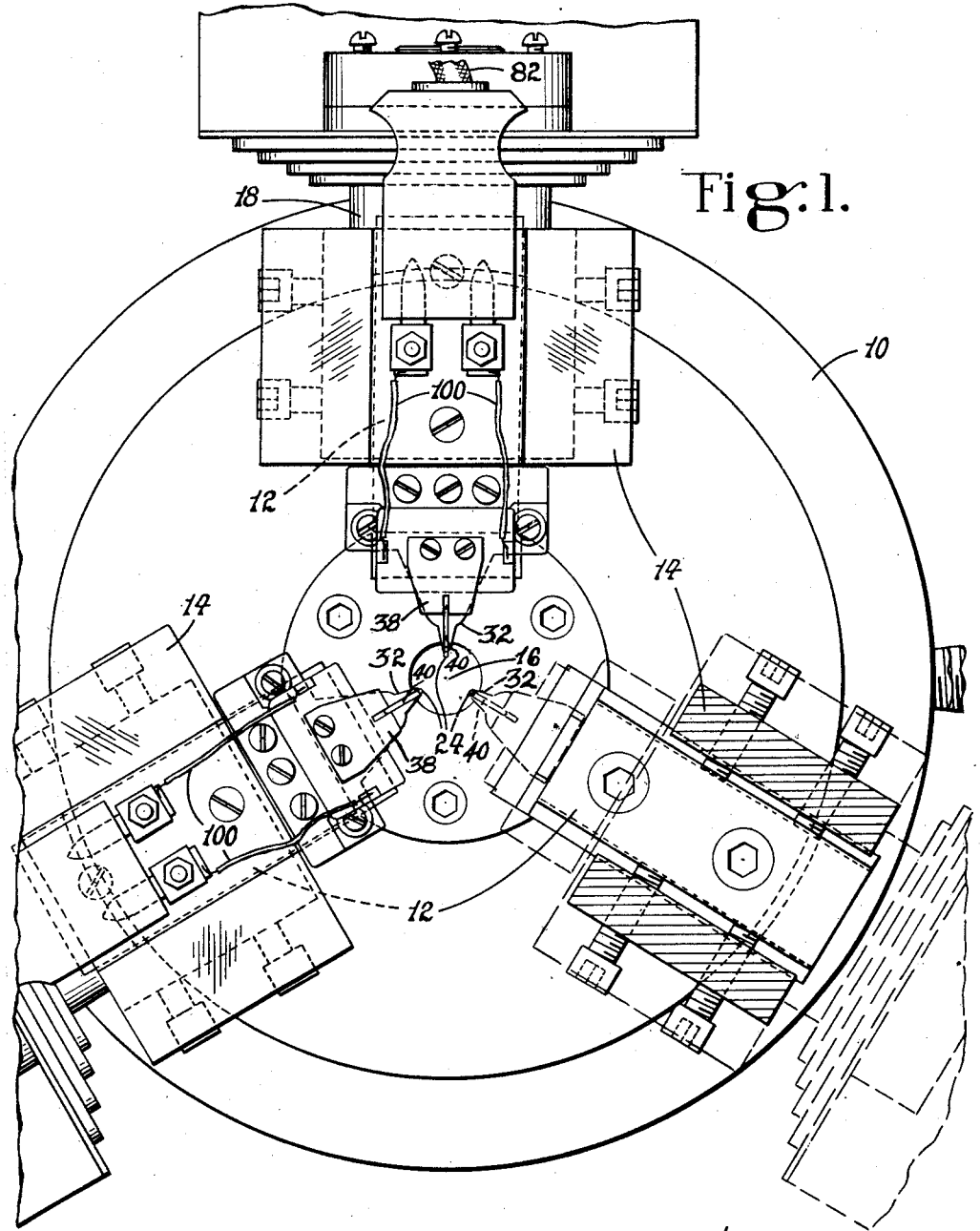

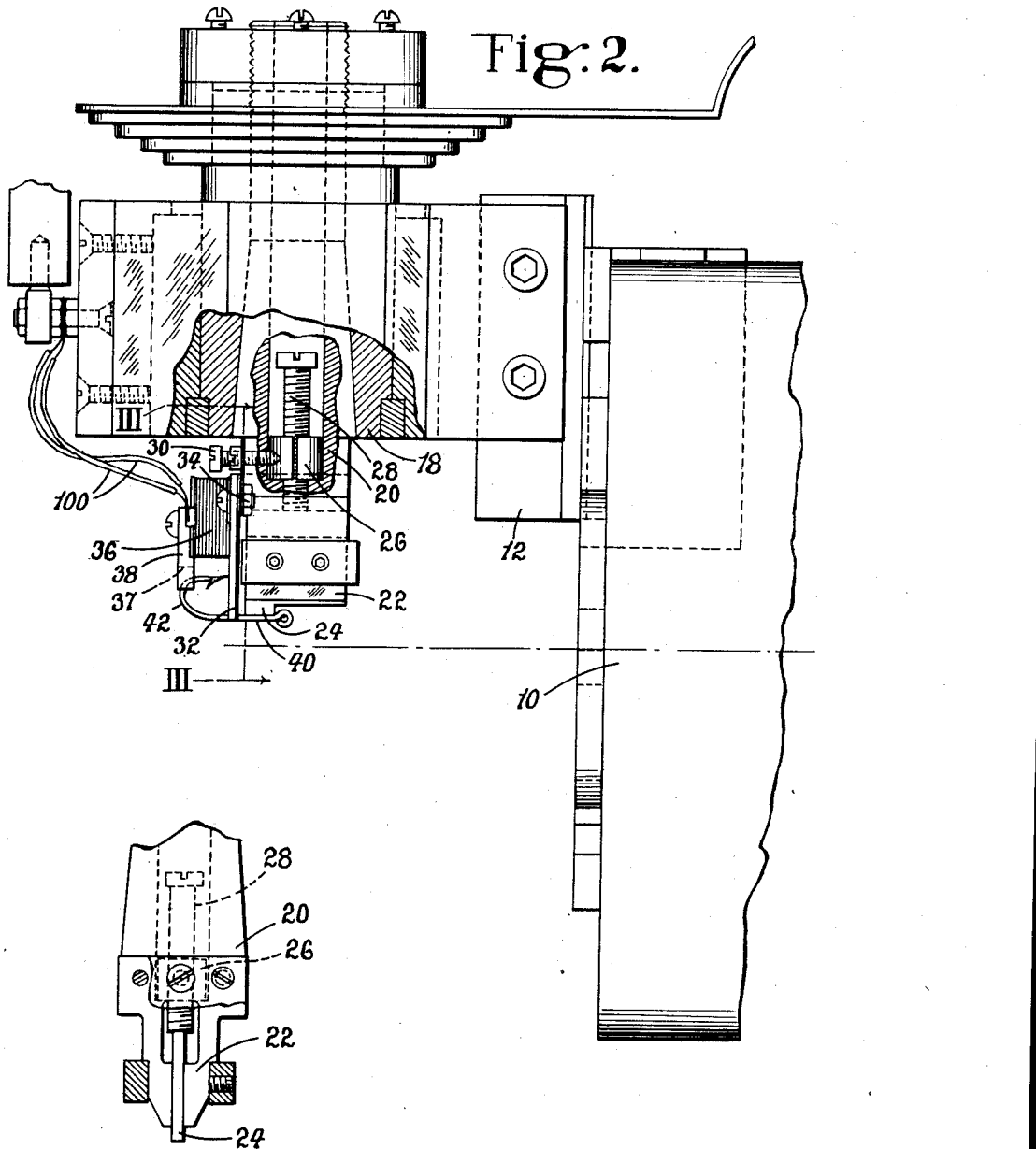

INVENTORS
William J. De Witt
Andrew Hommel
Alexander Schonwald
by their attorney
Frederick L. Edmand

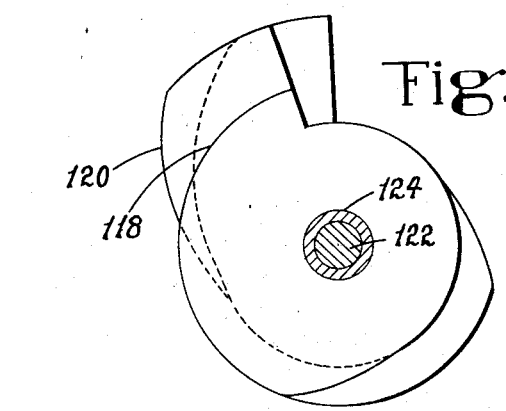
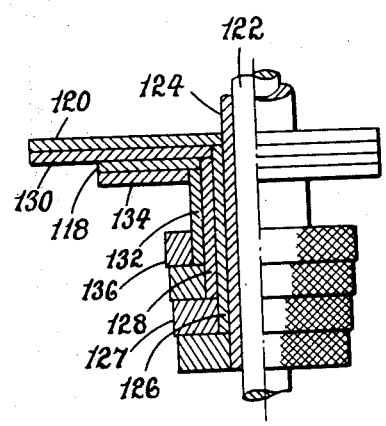
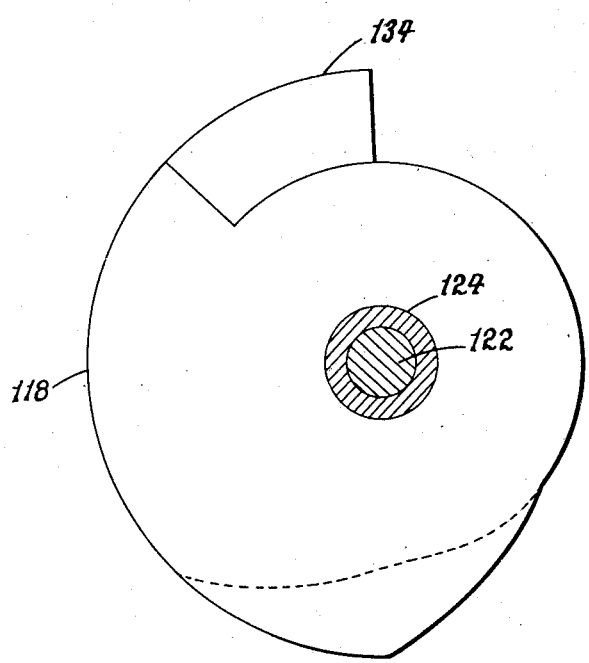

Patented June 8, 1943

2,321,068

UNITED STATES PATENT OFFICE 2,321,068

METHOD OF WELDING

William J. De Witt, Andrew Hommel, and Alexander Schoenwald, Auburn, N. Y., assignors to Shoe Form Co. Inc., Auburn, N. Y., a corporation of New York Application January 23, 1941, Serial No. 375,658

5 Claims. (Cl. 219—10)

This invention relates to methods of welding metallic parts and is herein illustrated in connection with the welding together of three component parts to form a triply-barbed fishhook.

In the welding of surfaces and edges of small metallic articles, considerable difficulty has heretofore been experienced in obtaining good electrical contact between the parts to be welded, due to unevenness of the surfaces or edges, with the result that the welding occurs at only one point and other points along the surfaces or edges are subjected only to annealing. The proper welding temperature exists only at the points of close contact of the parts, and this is limited practically to only a few points. It is an object of the present invention to provide an improved method which will overcome these diadvantages and extend the welding operations to areas of any desired dimension. Accordingly, the invention contemplates a method by which the surfaces or edges to be welded are subjected to repeated and separate heat treatments. The first heat treatment causes the weld areas to become plastic, with the result that pressure applied to the parts to be welded causes them to engage each other over a uniform area, providing a good electrical contact. After the first heat treatment, a welding current is passed through the parts effecting a welding operation to secure the parts together. Preferably and as shown, the method consists in positioning three elongated metal articles together in such manner that they engage each other along three contacting areas, connecting each article to a different phase of a three-phase alternating current, and passing a current of welding strength through the circuit to weld the articles together along the contacting areas. Preferably, pressure is applied to the articles to bring them into close engagement, and a preheating current is passed through them to produce good electrical contacts along the contacting areas prior to application of the welding current.

It has been found that this method is effective in producing exceptionally strong bonds between the welded parts, and is particularly adapted to use in forming triply-barbed fishhooks from three individual hooks, the shank of each individual hook being securely welded to the shanks of the other two hooks.

These and other features of the invention are described in the following specification and accompanying drawings and are pointed out in the appended claims.

In the drawings,

Fig. 1 is a view in front elevation, partly in section, of the chuck constructed in accordance with my invention;

Fig. 2 is a side elevation, partly in section, of one of the jaws of the chuck;

Fig. 3 is a cross sectional view, taken along lines III—III of Fig. 2, showing a welding electrode;

Fig. 8 is a diagrammatic view of an adjustable cam for controlling the preheating current;

Fig. 9 is a diagrammatic view of an adjustable cam for controlling the welding current; and Fig. 10 is a plan view, partly in section, of the mounting for the cams.

Figure 4:
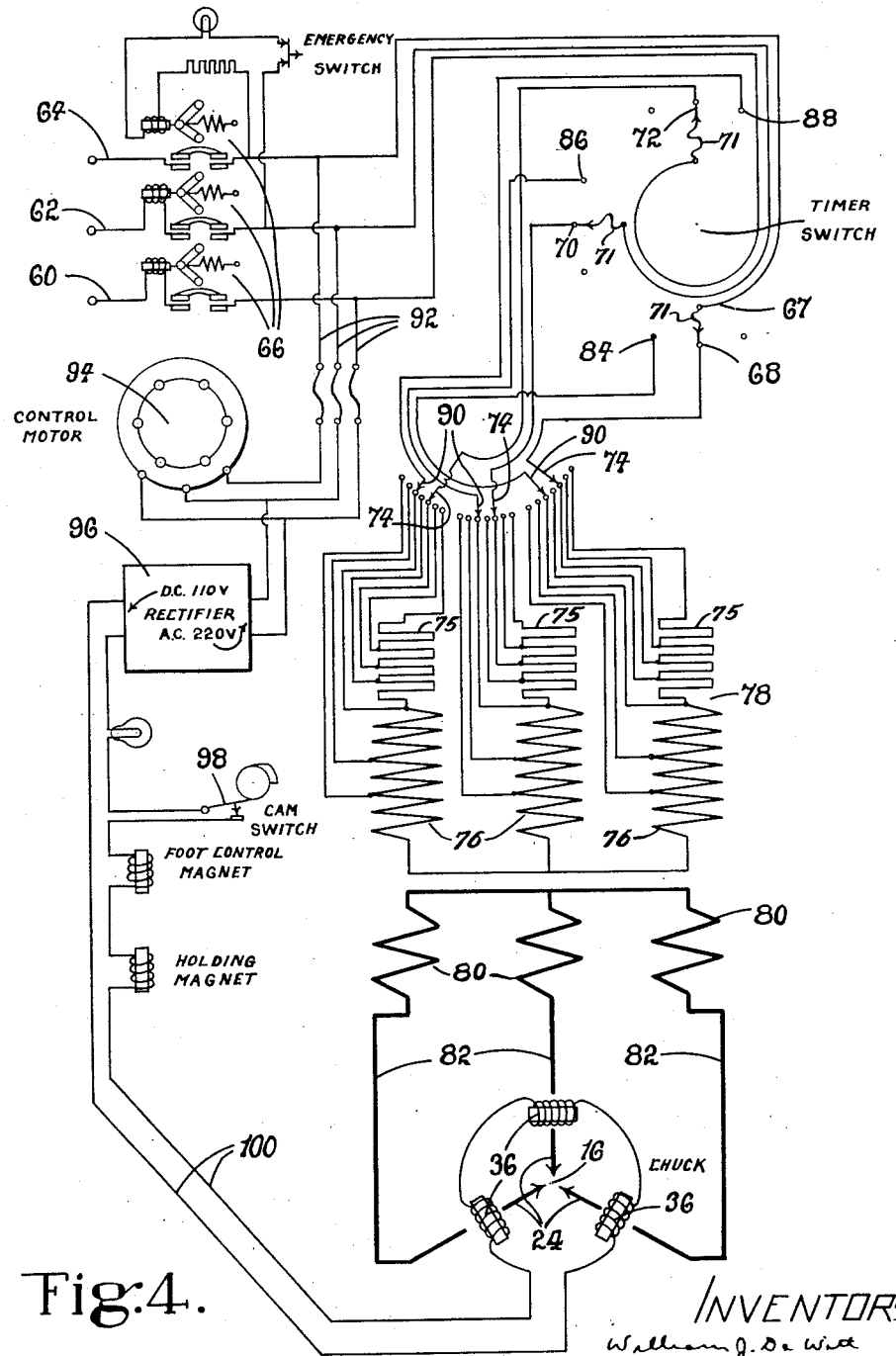
Fig. 4 is a diagrammatic view illustrating the arrangement of the apparatus and the wiring therefor.

The invention is illustrated in connection with the formation of triply-barbed fishhooks, each comprising a hook portion and a shank portion, the shank portions being welded together so that the hook portions extend outwardly from the combined shank at intervals of 120°. As is customary, one of the shank portions terminates in an eye.

Fig. 1 discloses an air chuck 10 having three jaws 12 slidably mounted in guides 14 for movement toward and away from a common axis 16. The air chuck, just mentioned, is of any suitable commercial type, the jaws being operable in and out by compressed air under the control of air valves. Each of the jaws carries a sleeve 18 (Figs. 1 and 2), in which is positioned a spindle 20 having a split end portion 22 which carries an electrode 24 (Figs. 2 and 3). The spindle 20 is hollow and has therein at its lower end portion a split collar 26, through which extends a screw 28 engaging the split portion 22 by which the electrode 24 can be adjusted axially of the axis 16. A set screw 30 is provided to engage the collar 26 to lock the screw 28 in adjusted position. The uppermost of the jaws 12 is provided with a gage 32, which can be located by means of a lock nut 34 in adjusted position heightwise of the axis 16, thus to facilitate location of three hooks in close engagement with each other at the axis.

In order to provide for holding the hooks in the several jaws 12, each jaw has a solenoid 36 arranged to magnetize the end portion of the gage 32 to hold hooks in position when placed thereagainst.

As shown in Fig. 2, a hook 40 is located in position with its shank portion in engagement with the electrode 24 in contact with the lower end of the gage 32, while its hook portion 42 extends into a slit 37 in a gage plate 38, thus locating the hook in a vertical plane.

When the jaws 12 of the air chuck are moved toward each other and the axis 16, the shanks of three hooks held in position in the jaws will be brought together substantially at the axis 16 and with each shank engaging shanks of the two adjacent hooks in position to be welded.

As illustrated in the circuit diagram in Fig. 4, there are three leads 60, 62 and 64 connected to a suitable source of power (not shown), but preferably one supplying a three-phase alternating current of 220 volts, approximately 50 amperes. Current from these three leads passes through circuit breakers 66 to a rotary timer switch 67. The timer switch has terminals 68, 70 and 72 from which the preheating current can be conducted to variable switches 74, which make contact with terminals leading to variable resistance units 75 connected in series to three windings 76 of a transformer 78, which has secondary windings 80 connected through three leads 82 to the electrodes 24. The timer switch is also provided with three terminals 84, 86 and 88 from which a welding current can be conducted through variable switches 90, which make contact with terminals leading directly to taps on the windings 76 and thence through the windings 80 to the electrodes 24. By shifting the positions of the switches 74 and 90, the strength of the preheating and welding currents can be varied. Leads 92 extend to terminals of a three-phase motor 94, operatively connected to the timer switch to rotate the same. Current drawn off from two of the leads 92 passes to a rectifier 96, thence to circuit-controlling devices including a cam timer switch 98, also driven from the motor 94, through leads 100, to a circuit, including the solenoids 36.

The rotary timer switch 67 illustrated diagrammatically in Fig. 4 is shown with three switch members 71 in engagement with the terminals 68, 70 and 72, such that the current can pass through the resistance units 75 and windings 76 of the primary of the transformer and produce a current of heating strength in the secondary circuit. During operation upon blanks, the switch members 71 are shifted to engage terminals 84, 86 and 88 to cause the current to by-pass the resistance units and to pass directly to the primary windings, with the result that a comparatively large current of welding strength is produced in the secondary circuit.

Figure 5:
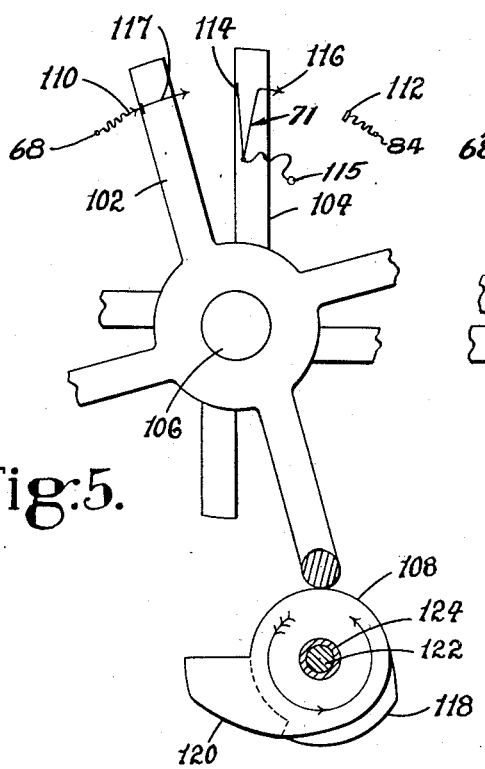
Figs. 5, 6 and 7 are views in side elevation, partly in section, of a timer switch used in the electric circuit.
Figure 6:
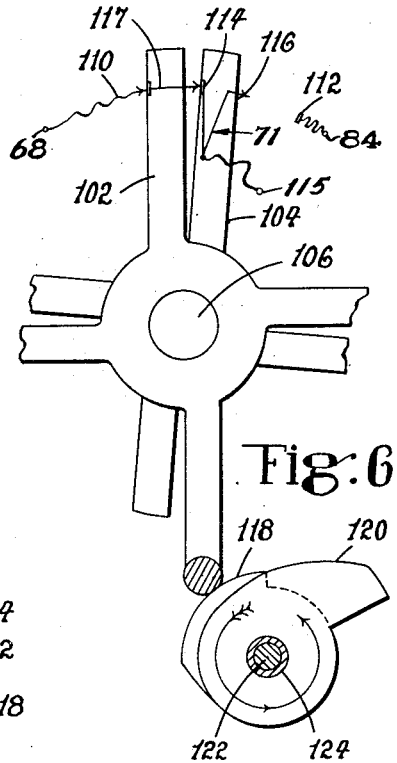
Figure 7:
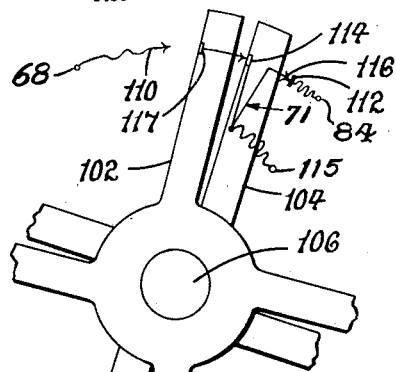

The mechanisms for controlling the switch members 71 are similar and one of them, for controlling the current passing through terminals 68 and 84, is illustrated in Figs. 5, 6 and 7. This mechanism comprises two four-arm members 102 and 104 mounted side by side upon a shaft 106, the members being rotatable intermittently by means of a double cam 108. The members are arranged during operation of the timer switch to oscillate between a resilient heating circuit contact 110 connected to the terminal 68 and a welding circuit contact 112 connected to the terminal 84. The arm 104 carries the switch member 71 comprising contact members 114 and 116, arranged, respectively, to engage a contact member 117 on the arm 102 and the welding circuit terminal 112. The contact members are connected to one of the power leads at a terminal 115. In order to control the opening and closing of the heating circuit and the welding circuit, the cam 108 has a surface 118 arranged to rotate the arm 102 in a clockwise direction, thereby, as shown in Fig. 6, to close the switch between the power connection and the heating circuit. The cam is provided with a second cam surface 120 operable upon rotation into the position shown in Fig. 7 in which the heating circuit has been opened and the terminal 116 is in engagement with the welding circuit terminal 112, thus closing the welding circuit.

In order to provide for varying the amount of time which the preheating current and the welding current are operable, the timer cams are provided with extensions which can be adjusted to vary the times which the preheating circuit and the welding circuit remain closed. Fig. 10 shows the mounting of the timer cams. This mounting comprises a shaft 122, upon which is mounted a sleeve 124 which carries the cam surface 120. A second sleeve 126 carries a cam surface 130 mounted adjacent to the cam surface 120 and arranged, upon rotation of the sleeve 126 by means of a nut 127, to be positioned angularly about the shaft relatively to the cam surface 120 to form an extension of that surface, as shown in Fig. 8. Similarly, a sleeve 128 carries the cam surface 118 and a sleeve 132 carries a cam surface 134, which can be adjustable angularly by means of a nut 136 to position the cam surface 134, as an extension of the cam surface 118. Thus, by adjustment of the various cam surfaces the length of time, which the surfaces will maintain the heating and welding circuits closed, can readily be regulated.

In carrying out the method as applied to the formation of a triply-barbed fishhook, three individual hooks 40, one of which has an eye, are located in the jaws 12 of the chuck 10, with the shank of each hook positioned in contact with an electrode 24 and with the barbed portion of the hook turned outwardly and positioned in the slit 37 in the gage 38, the hooks being held in fixed position in contact with the electrodes 24 by the solenoids 36. The jaws of the chuck are then actuated to bring the shanks of hooks into engagement with each other about the axis 16 of the chuck. Through operation of the timer switch 67 a three-phase current is passed through the transformer 78 to the electrodes 24, the current being initially carried through the resistance units and the windings of the transformer to cause a current of preheating strength to pass through the hooks and then through the windings of the primary only thereby to cause a current of welding strength to pass through the electrodes to the hooks to weld the same together. By reason of the three-phase characteristic of the circuit, the welding current will pass successively through each two adjacent hooks forming a weld along the surfaces of contact.

The intensities of the preheating and welding currents can be varied by shifting the position of the variable switches 74 and 90, and the duration of the applied currents can be varied by adjusting the positions of the cam extensions 130 and 134.

Having described our invention, what we claim as new and desire to secure by Letters Patent of the United States is:

1. The method of welding together three elongated metal articles, which consists in placing the articles together in such manner that each of them is in engagement with the other two, applying pressure to force the articles together, connecting each of the articles to a different phase of a three-phase alternating current circuit, and passing a current of welding strength through the circuit while said pressure is maintained thereby to weld the articles together along the areas of engagement.

2. The method of welding together three elongated metal articles, which consists in placing the articles in position such that each is in close engagement with the other two thus forming three contacting areas, applying pressure to the articles to force them together along the contacting areas, connecting each of the articles to a different phase of a three-phase alternating current circuit, and passing a current of welding strength through the circuit while said pressure is maintained thereby to weld the articles together along the contacting areas.

3. The method of welding together three elongated metal articles, which consists in positioning the articles in such manner that they engage along three contacting areas, applying pressure to the articles to form pressure contacts along the articles, connecting each of the articles to a different phase of a three-phase alternating current circuit, passing a preheating current through each of the articles to form a good electrical contact in each of the areas, and passing a current of welding strength through the circuit to weld the articles together along the contacting areas, said pressure being maintained during passage of the currents through the articles.

4. The method of forming a triply barbed fishook, which consists in providing three single barbed hooks, positioning each of the hooks with its shank portion in engagement with the shank portions of the other two hooks, connecting each shank portion to a different phase of a three-phase alternating electric current circuit, passing a current of preheating strength through the hooks to provide good electrical contacts in the contacting areas, and then passing a current through the circuit of sufficient strength to weld each of the shank portions to the shank portions of the adjacent hooks.

5. The method of forming a triply barbed fishhook, which consists in providing three single barbed hooks, positioning each of the hooks with its shank portion in engagement with the shank portions of the other two hooks, connecting each shank portion to a different phase of a three-phase alternating electric current circuit, and then passing a current through the circuit of sufficient strength to weld each of the shank portions to the shank portions of the adjacent hooks.

WILLIAM J. DE WITT.
ANDREW HOMMEL.
ALEXANDER SCHOENWALD.